United States Patent [19]
Hoekstra et al.

[11] 3,874,959
[45] Apr. 1, 1975

[54] METHOD TO ESTABLISH THE ENDPOINT DURING THE DELINEATION OF OXIDES ON SEMICONDUCTOR SURFACES AND APPARATUS THEREFOR

[75] Inventors: Jan P. Hoekstra, Putnam Valley; Frederick H. Dill, South Salem, both of N.Y.

[73] Assignee: International Business Machines Corporation, Armonk, N.Y.

[22] Filed: Sept. 21, 1973

[21] Appl. No.: 399,668

[52] U.S. Cl. .......................... 156/7, 156/16, 156/17, 156/345, 204/129.2

[51] Int. Cl. .......................................... B29c 17/08

[58] Field of Search ............... 156/17, 16, 2, 7, 345, 156/378, 379; 204/129.2, 129.3; 356/218; 73/86, 336.5

[56] References Cited

UNITED STATES PATENTS

| | | | |
|---|---|---|---|
| 2,875,141 | 2/1959 | Noyce | 156/17 X |
| 3,162,589 | 12/1964 | Pensak | 204/129.3 X |
| 3,494,791 | 2/1970 | Eugster | 156/17 X |
| 3,755,026 | 8/1973 | Reynolds | 156/345 X |

*Primary Examiner*—William A. Powell
*Attorney, Agent, or Firm*—Sughrue, Rothwell, Mion, Zinn & Macpeak

[57] ABSTRACT

A semiconductor device having a dielectric coating on at least one surface is mounted in a special holder which will allow the etching solution to contact only one oxide coated surface of the semiconductor to etch the same according to a predetermined pattern. A first electrical lead is connected either directly or indirectly to the opposite surface of the semiconductor and a second electrical lead is connected to an electrode disposed in the etching solution. Both of these are connected to a meter or detector for sensing any current between the two leads through the semiconductor. A chopped d.c. light source is focused to provide a spot of light at at least one etching point so that upon removal of the dielectric, the pulsating light beam will generate an a.c. signal on the semiconductor which will be detected by the meter to signal the etching endpoint.

4 Claims, 2 Drawing Figures

METHOD TO ESTABLISH THE ENDPOINT DURING THE DELINEATION OF OXIDES ON SEMICONDUCTOR SURFACES AND APPARATUS THEREFOR

BACKGROUND OF THE INVENTION

1. Field of the Invention

The present invention is directed to a method for establishing the endpoint during the delineation of oxides or other insulators deposited or grown on semiconductor devices and more specifically to an electro-optical system for generating and detecting an electrical signal across the semiconductor device to determine the exact moment at which the etching should terminate.

2. Prior Art

In order to properly delineate a pattern by means of chemical etching, it is important to establish the moment where the undesired material is removed. If the etch process is extended past this moment, problems such as undercutting or lack of control of pattern size will be encountered.

In the past, the methods available to determine when the oxide has been removed included a simple visual inspection with a microscope. This method relies upon apparent color changes of the oxide when the oxide becomes thinner. Such a method is obviously very time consuming since the etching process must be interrupted periodically for inspection and the inspection itself tends to be very subjective.

Another prior art method involved checking the surface of the semiconductor for a change from a hydrophylic to a hydrophobic state or vice versa depending upon the initial surface state of the semiconductor. Once again, this method is very subjective and cannot be preformed in situ.

A third method involves an electrical measurement of the silicon surface. If an oxide is present, no contact can be made. By repeatedly testing for contact, one can determine when the etch point is reached. Once again, this method is very subjective and is very much dependent on contact pressure thereby making it difficult to interpret the results. As with the previous two methods, the etching process must be interrupted by removing the silicon semiconductor from the etching solution periodically.

In setting up a manufacturing process dealing with oxide etching, the information necessary to determine the total etch time to remove the oxide is derived by etching a single wafer and examining the pattern with one of the three earlier described methods. This information is then used to etch a large batch of wafers. However, not only do the conditions of the wafers differ from each other, such as oxide thickness, but the temperature gradient of the etchant across the batch can cause the etch rate to differ. The conditions under which the test sample and the batch wafers are etched are sufficiently different to cause both extremes in etching results. In practice, to make sure that the oxide has been removed, the etch time derived from the test sample is increased by as much as 50% thereby making it difficult, if not impossible to obtain good control on pattern size.

SUMMARY OF THE INVENTION

The present invention provides the only type of etch endpoint detector which can determine photoelectrically and in situ when the oxide has been removed thereby minimizing or completely eliminating problems such as undercutting, overetching, lack of dimensional control, lifting of photo resist, effects of temperature change in the etching process and varying film thickness.

The present invention provides an etch endpoint detector which allows automation in areas not previously possible since the subjective element is completely removed.

The present invention provides an etch endpoint detector which can monitor several areas on the substrate independent of each other simultaneously, since an independent reading of each area can be obtained.

The present invention provides a method and apparatus for automatically detecting the etch endpoint in situ. A substrate holder is provided for mounting the oxide coated semiconductor in such a manner that only one surface of the oxide will be exposed to the etching solution in a bath. A first electrical lead is connected either directly or indirectly to the unexposed surface of the semiconductor depending on whether the unexposed surface does not have or does have an oxide coating thereon respectively. A second electrical lead is connected to an electrode disposed in the etching solution and both leads are connected to a detector device such as a meter or the like. A chopped d.c. light source is focused to provide a small beam of light at one or more points on the oxide coating which is being etched so that upon removal of the oxide the beam of light will contact the semiconductor. The pulsating beam of light will generate an a.c. signal from the surface of the semiconductor which will be detected when the dielectric is removed so that the etchant makes electrical contact with that surface to signal the etch endpoint.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
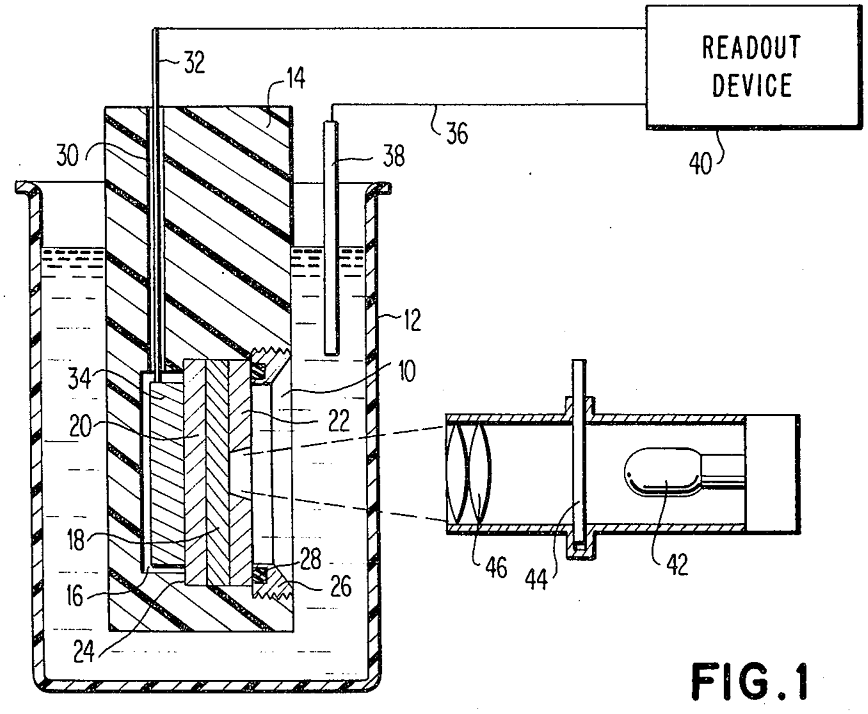
FIG. 1 is a schematic view of the apparatus, partly in section, for detecting the etch endpoint according to the present invention.

In FIG. 1, the etching solution 10 is disposed in any suitable container 12 of plastic material or the like which will be resistant to the etching solution. The etching solution may be a weak hydrofluoric acid solution or any other suitable solution. A substrate holder 14 is provided which may be of plastic or any other suitable material which will be resistant to the etching solution 10. The holder is provided with a cavity 16 for receiving the semiconductor substrate 18. The semiconductor substrate 18 may be of silicon and as shown in FIG. 1, is provided with an oxide coating 20 and 22 on both sides thereof. The cavity is provided with a shoulder 24 for supporting the substrate and a suitable locking means 26 for engaging the opposite surface of the substrate to secure the substrate against the shoulder 24. If the substrate is a circular wafer, the locking means 26 may be a ring which is screw threaded into the holder 14. The locking means 26 is provided with a gasket such as an O-ring 28, or the like. If the substrate configuration is other than circular, the locking means 26 can be secured in the holder 14 by any suitable means and would be provided with a gasket extending about the entire periphery of the substrate to prevent the etching solution from reaching the opposite surface of the substrate. The exposed surface of the oxide 22 is coated with a resist in a predetermined pattern as is well known in the art so that only the uncoated portion of the oxide will be removed by the etching solution.

The holder 14 is provided with a passage 30 which communicates with the recess 16 and an electrical lead wire 32 passes therethrough. The lead wire 32 is connected to a metal contact 34 which in the embodiment of FIG. 1 is electrically connected to the substrate 18 by a capacitive connection. If no oxide is present on the unexposed surface of the substrate 18 an ohmic connection will be made between the metal plate 34 and the substrate 18. The sensitivity of the capacitive connection is 1mv/$10^{-5}$ inch$^2$ when measured across a 1 M ohm resistance. The sensitivity when an ohmic contact is made can be an order of magnitude greater. A second electrical lead 36 is connected to an electrode 38 which is disposed in the etching solution and the lead 32 and 36 are connected to a suitable detector or readout device 40 such as a meter or the like. It is also contemplated that the detector signal could be utilized to operate a suitable servo-mechanism for automatically removing the substrate holder 14 from the solution when the etch endpoint is detected.

A d.c. light source 42 is provided outside of the container 12 and is disposed in alignment with a suitable mechanical shutter 44 and lenses 46 so that a pulsating light beam will be focused on a portion of the oxide coating 22 which is to be etched away by the etching solution. The mechanical shutter 44 is only shown schematically since any suitable type of mechanical shutter could be utilized to provide the necessary pulsating light beam. To obtain optimum conditions with a light spot as small as possible, it should encompass enough pattern so that the area to be etched will be larger than $10^{-5}$ inches squared. In order to avoid aligning of the substrate with the optical apparatus, one can choose a light spot that covers an area so that under all conditions the surface to be etched is at least $10^{-5}$ inches squared. This will be dependent upon the pattern size and ratio of surface area etched and surface area protected.

Figure 2:
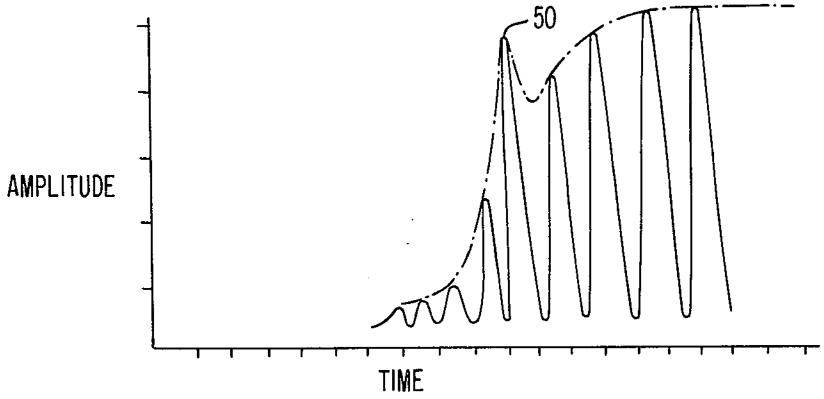
FIG. 2 is a graph of the amplitude of the detected signal plotted against time during an etching operation.

In operation, an oxide coated semiconductor wafer is secured in the support 14 as shown in FIG. 1 and a chopped d.c. light beam is focused on the surface of the oxide coating at a point which is intended to by etched away. As shown in FIG. 2, during the first portion of the etching, no signal will be detected across the electrode 38 and the metal contact 34. However, as the oxide coating is etched away and begins to near the optimum endpoint, a small signal will be detected as the etching solution begins to make electrical contact with the material of the substrate 18. The amplitude of this signal will increase sharply as the remaining oxide in the area to be etched is removed until the signal reaches a maximum at 50 which indicates that the optimum etch endpoint has been reached. The detecting apparatus 40 will be responsive to the initial peak of the signal at 50. If an operator is merely watching a meter he can readily detect the peaking of the signal and take the appropriate action to remove the holder and the substrate from the etching solution. In the event the removal of the holder is automatic, the initial maximum signal detection at 50 can be sufficient to trigger a suitable servomechanism for removing the holder. Likewise, if the detector 40 is the buzzer, light or other suitable alarm, the initial peaking of the signal at 50 will be sufficient to activate the alarm to indicate that the desired endpoint has been reached.

The arrangement shown in FIG. 1 is somewhat schematic inasmuch as it is only a single holder, substrate and light beam arrangement. It is contemplated that the present invention could be utilized for simultaneously detecting a plurality of etch points on a common substrate, or an arrangement could be made to detect the etch endpoints on a plurality of substrates on two individual holders or in a common holder.

While the invention has been particularly shown and disclosed with reference to a preferred embodiment thereof, it will be understood by those skilled in the art that various changes in form and details may be made therein without departing from the spirit and scope of the invention.

What is claimed is:

1. Apparatus for determining the etch endpoint of an oxide from a semiconductor substrate comprising:

container means for holding an etching solution, substrate holding means for supporting an oxide coated substrate in an etching solution with only one oxide coated surface of said substrate being exposed to said etching solution, electrical detecting means disposed in operative relation to opposite sides of said substrate for detecting a signal generated by light impinging on a surface of said substrate, and light source means for directing a beam of light on a portion of the exposed oxide coating to be etched away whereby when the proper amount of oxide has been etched away, the light beam will impinge on the exposed surface of said semiconductor to produce a signal indicating the etch endpoint.

2. Apparatus as set forth in claim 1 wherein said electrical detecting means comprises a first contact electrically connected to the surface of the semiconductor which is not exposed to the solution, an electrode adapted to be disposed in said solution and a signal detecting means connected to said first contact and said electrode.

3. Apparatus as set forth in claim 1 wherein said light source means includes d.c. light source, means for periodically interrupting the light from said source and means for focusing said light on the exposed oxide coated surface of said substrate.

4. A method for detecting the etch endpoint of the oxide coating on the surface of a semi-conductor substrate comprising, immersing said substrate in an etching solution with only one oxide coated surface thereof exposed to the etching solution, directing a chopped beam of d.c. light on a portion of the oxide coating to be etched away to generate an a.c. signal on the surface of said substrate when said beam makes contact with said substrate, sensing said signal, and applying said signal to means for indicating the etch endpoint.

* * * * *